United States Patent [19]
Cave

[11] Patent Number: 5,754,631
[45] Date of Patent: May 19, 1998

[54] VOICE RESPONSE UNIT HAVING ROBOT CONFERENCE CAPABILITY ON PORTS

[75] Inventor: Ellis K. Cave, Garland, Tex.

[73] Assignee: InterVoice Limited Partnership, Reno, Nev.

[21] Appl. No.: 723,299

[22] Filed: Sep. 30, 1996

[51] Int. Cl.⁶ .................... H04M 3/50; H04M 3/56; H04Q 11/04
[52] U.S. Cl. .................... 379/88; 370/267; 379/202
[58] Field of Search ............... 379/202, 88, 213, 379/210, 67; 370/267, 266

[56] References Cited

U.S. PATENT DOCUMENTS

| | | | |
|---|---|---|---|
| 4,646,288 | 2/1987 | Shumwag | 370/267 |
| 5,056,086 | 10/1991 | Libonati | 379/88 X |
| 5,363,441 | 11/1994 | Feiner et al. | 379/202 X |
| 5,548,638 | 8/1996 | Yamaguchi et al. | 379/202 |
| 5,590,186 | 12/1996 | Liao et al. | 379/210 |

*Primary Examiner*—Thomas W. Brown
*Attorney, Agent, or Firm*—Fulbright & Jaworski L.L.P.

[57] ABSTRACT

A Voice Response Unit (VRU) 10 provides ports 12 to which communications devices 13 may be coupled. Two-way conversations between ports 12 are enabled by inter-port connections made by system bus 16 as controlled by distributed switch 15. Summation resources 25, permanently inserted in signal paths to and from ports 12, provide digital summers 33A, 33B and 33C that then permit signal processing resource 22 to be conferenced in on said two-way conversations without having to route signals through conference bridge resources.

14 Claims, 2 Drawing Sheets

5,754,631

VOICE RESPONSE UNIT HAVING ROBOT CONFERENCE CAPABILITY ON PORTS

TECHNICAL FIELD OF THE INVENTION

This invention relates to communications systems, and more particularly to a Voice Response Unit ("VRU") whose three-way call conference capability on each port enables two live parties in conversation to have a VRU signal processing resource conferenced on the conversation without using a conference bridge.

BACKGROUND OF THE INVENTION

As telecommunications interactivity between people and Voice Response Units ("VRUs") becomes more common, situations often arise when a 3-way conference including two people and a robotic function within a VRU is highly advantageous. For example, there may come a point in a VRU communication between a customer and a robot when it is useful for a live customer service agent to enter the conversation. Alternatively, at some point during a customer's conversation with the customer service agent, it can become desirable to conference in a robot to record both sides of the conversation or to announce to both parties.

For example, a customer may call in to a stockbroker to purchase stock. Certain preliminary communications may be handled by a robot, such as checking the customer's account balance, or determining the current price of the stock sought to be purchased. At some point, however, the customer may wish to talk to the live stockbroker, such as to discuss current prices as announced by the robot, or even to get help in the use of the robot. Clearly, a 3-way conference is advantageous.

Alternatively, the customer and stockbroker may already be in communication, and at some point it may become desirable to record both sides of the conversation. To enable this, it is clearly advantageous to conference in a robot that combines both sides of the conversation, and then records them on one single voice track. The robot may then also be prompted to play something back to both parties simultaneously.

FIG. 1 illustrates basic switched VRU architecture of the current art. VRU 10 comprises a plurality of ports 12 connected to Public Switched Telephone Network (PSTN) 17. As shown, users of communications devices 13 may thus be coupled to ports 12 over PSTN 17.

Ports 12 may advantageously be distributed across one or more cards 14. Ports 12 are interconnectable on each card via a distributed switch 15 with a distributed portion on each card 14. Ports 12 are further interconnectable across cards 14 by distributed switch 15 operating in combination with system bus 16. It will be understood that system bus 16 comprises channels onto which distributed switch 15 may switch ports 12 from different cards to facilitate said cross-card interconnections.

Distributed switch 15 in combination with system bus 16 also connects cards 14 to conference bridges 18. Again, conference bridges 18 are advantageously located on a separate bridge card 20. In this way, it will be understood that ports 12 are also connectable with a conference bridge 18 via distributed switch 15 and system bus 16.

With further reference to FIG. 1, the prior art also typically signal processing resources 22 (the "robot") at one or more of ports 12, and advantageously at each port 12. Such signal processing resources 22 may include automated speech playback, voice record, text-to-speech and/or voice recognition functionality. Unassigned signal processing resources 22A may also be provided on bridge card 20. In the prior art, switch means 21 is disposed to connect communications received at port 12 either to signal processing resources 22 or to distributed switch 15, but not both. Thus, control means (not illustrated) may activate switch means 21 to connect a signal processing resource 22 to a port 12, but in doing so will prevent that port from being able to exchange signals with another port 12 through distributed switch 15 and system bus 16. Conferencing for that port 12 is thus not possible. In order to facilitate multi-party conferencing including a robot, ports 12 must be switched to a conference bridge 18 and conferenced in with unassigned signal processing resource 22A.

Within this architecture of the current art, it will therefore be seen that a 3-way conference including a signal processing resource 22, or "robot," requires use of a conference bridge 18 and the system bus 16, regardless of whether communications devices 13 are previously interconnected and the robot is later conferenced in, or whether a communications device 13 is first connected to the robot and another communications device 13 is later conferenced in.

This creates problems. First, channels are used unnecessarily on system bus 16. It will be appreciated that one such 3-way conference will occupy three channels on the system bus, and two such conferences in progress at the same time will occupy six channels. A typical VRU system bus 16 of the current art has limited number of channels, which also have to facilitate 2-way connections across cards, one channel per connection. Three-way conferences enabled in this way thus consume system bus capacity unnecessarily and tend to increase processing time.

In addition to the unnecessary consumption of system bus capacity, the additional traffic created by robot conferencing tends to complicate the VRU's software algorithm that allocates conference bridge resources.

Further still, it will be understood from the above description that switching intelligence is required in controlling when a port 12 is to be connected through to distributed switch 15, or to signal processing resource 22 instead. This requires processing capability that must know when to connect or disconnect the robot. This processing capability would be unnecessary if a port 12 was not required to switch modes in this way.

A possible improvement might lie in being able to switch a robot directly onto a two-way intra-card or cross-card connection between ports 12. In this way, a 3-way conference could perhaps be enabled without using a conference bridge 18. It will be understood, however, that in a standard 4-wire system, simple switching of the robot input and/or output onto both sides of a digital conversation is not feasible. It will be appreciated that simply tying the outputs of these resources together will present a conflict of two (or more) drivers both trying to drive the same line. The result will be a periodic tendency towards zero signal, and the combined signal will not be correct for either driver.

Accordingly, significant advantages would be gained if 3-way conferences with a VRU robot could be enabled without using a conference bridge.

SUMMARY OF THE INVENTION

The present invention provides summation resources at ports, and advantageously at each port, to facilitate the desired conferencing. These summation resources combine digital signals so that two users and a robot connected thereto can communicate together fully in a conference setting.

It will be understood that conference bridges were at one time considered to be a complex and expensive resource. This still holds true today for conference bridges disposed to conference together a large number of parties. Simple 3-way conference bridges can now, however, be provided at each port. Essentially, the same technology that now allows a robot to be placed cheaply at each port also allows a summation resource, operating as a conference bridge, also to be placed at each port.

The present invention addresses the need to conference two live parties with a robot, which is a frequent VRU operation, by providing summation resources at each port. In this way, these summation resources may handle a substantial portion of conferencing traffic that otherwise would use the VRU's system bus to reach a conference bridge. This in turn optimizes system bus capacity for other traffic. It will nonetheless be appreciated that VRUs in accordance with the present invention will still also advantageously provide traditional conference bridges to fulfill more complex conferencing needs.

As already noted, it will be understood that VRUs in accordance with the present invention operate entirely in a digital format. Analog communications from users, such as may be expected with most telephones, will therefore first have to undergo analog to digital conversion as part of the VRU port function.

According to the present invention, a robot advantageously resides at each port, connectable onto conversations in which the port is participating via a summation resource also resident at the port. The summation resource is permanently installed in the signal paths at the port. It will thus be understood that when two ports according to the present invention are connected, a 4-way conference between two ports and two robots is in fact enabled. It will therefore be seen that to enable a robot conference on a typical conversation between two ports, one port's robot will be participating in the conversation while the other port's robot will be silent.

Use of the summation resource in this way allows the robot to be conferenced on to a two-way conversation without having to switch the conversation to a conference bridge. System bus and conference bridge resources are thereby optimized.

The summation resource further permits digital communications to be conferenced without causing a conflict of drivers trying to drive the same line.

It is therefore a technical advantage of the present invention to optimize system bus and conference bridge resources by obviating the need to have robot conferencing through a conference bridge.

It is a further technical advantage of the present invention to simplify software algorithms controlling and allocating conference bridge resources by obviating the need to have robot conferencing through a conference bridge.

A still further technical advantage of the present invention is that by using summation resources to combine signals on a per-port basis, conflicts between drivers trying to drive the same line are avoided.

It is a yet further technical advantage of the present invention to simplify control over robots by obviating the need for robots to be switchable "in-line" or "off-line" at ports.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

As noted above, FIG. 1 represents VRU architecture of the current art in which communications devices 13 coupled to ports 12 may either be switched together or be switched to a signal processing resource 22 ("robot"). As noted above, signal processing resource 22 (the "robot") may include automated speech playback, voice record, text-to-speech and/or voice recognition functionality, as well as other processing features. Three-way conferences including a robot therefore require conference bridges 18 and unassigned signal processing resources 22A. FIG. 2 is an alternative representation of the current art according to FIG. 1, illustrating this architecture in a more conceptual, "block diagram" format.

Figure 1:
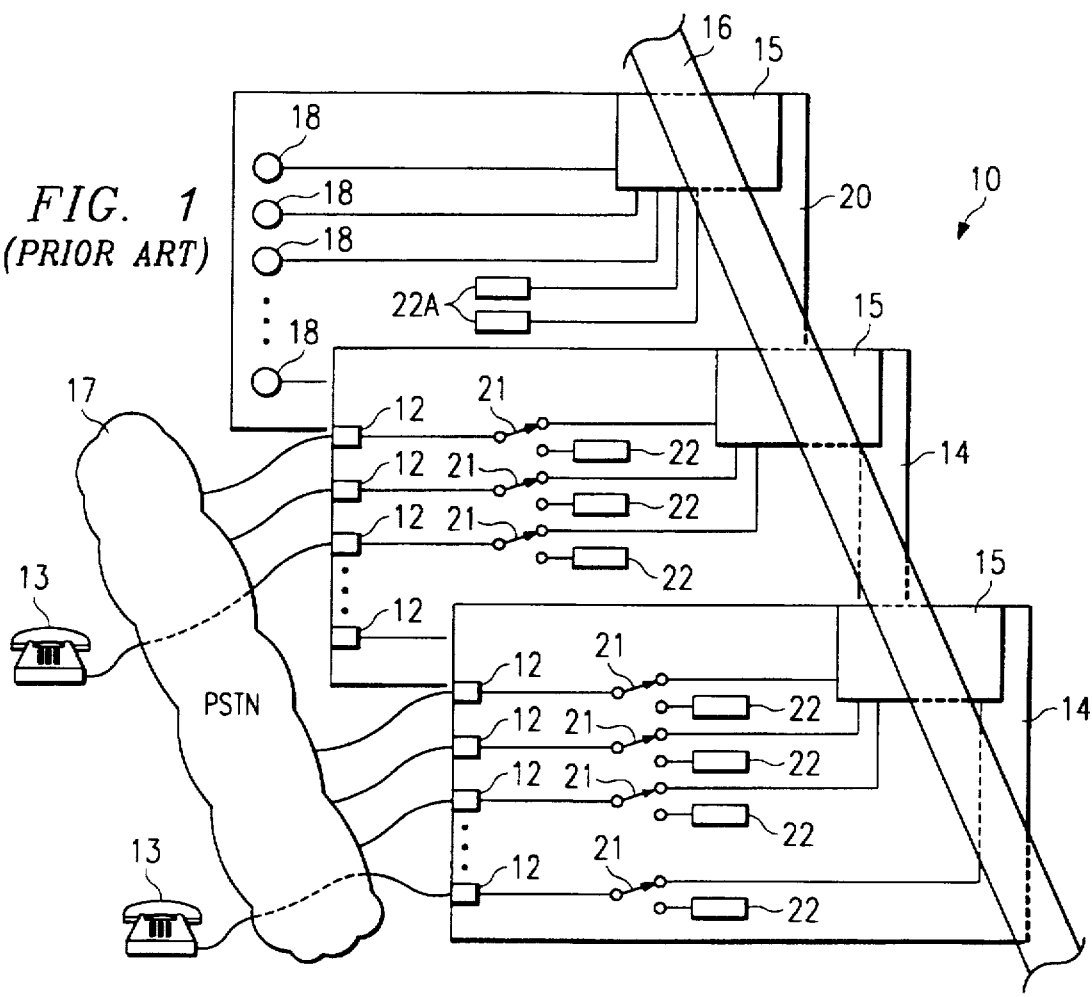
FIG. 1 illustrates VRU architecture of the current art in which 3-way conferences including signal processing resources 22 must be enabled using conference bridges 18.
Figure 2:
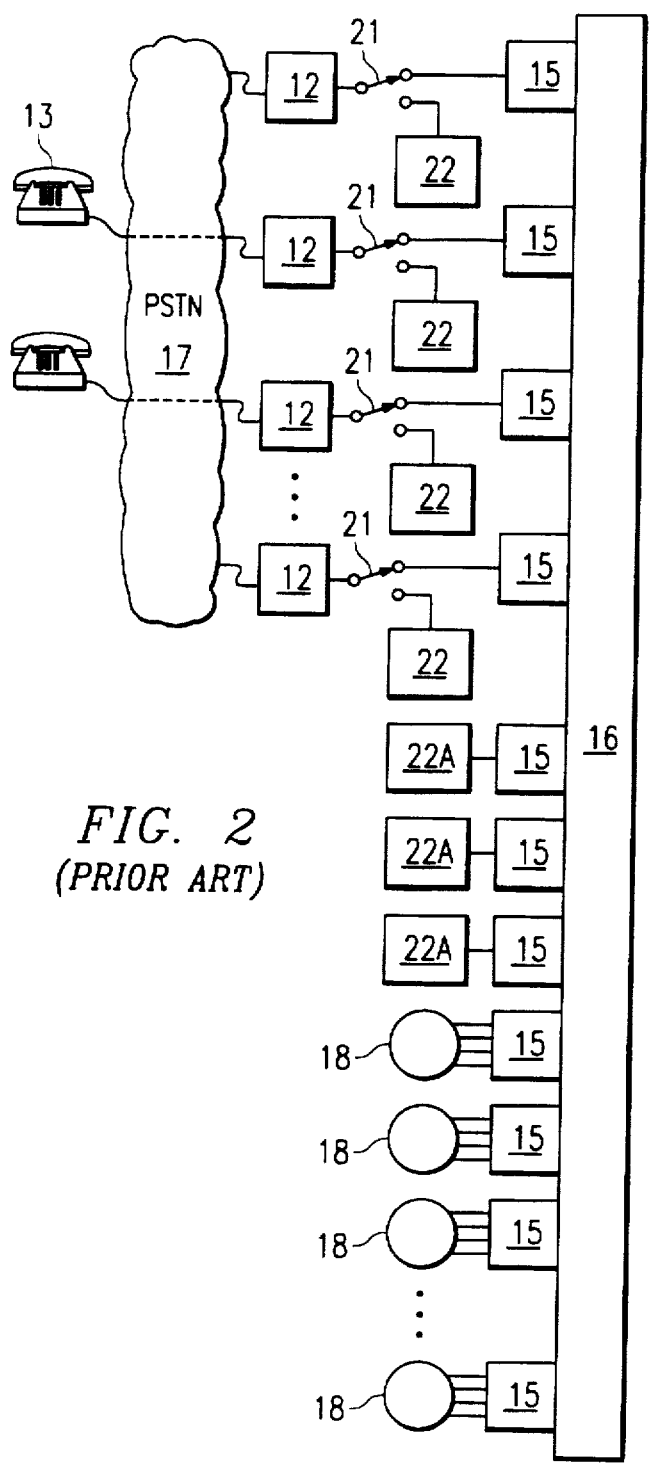
FIG. 2 is an alternative representation of the current art according to FIG. 1.

With reference to FIG. 2, and in comparison with FIG. 1, it will be seen that each of ports 12 are interconnectable via system bus 16, as controlled by distributed switch 15. Two-way conversations between communications devices 13 may thus be enabled. All ports 12 may also be allocated a conference bridge 18, and connected thereto via system bus 16 as controlled by distributed switch 15. In this way, 3-way conferences between resources on ports 12 may be enabled.

Ports 12 also each provide signal processing resources 22, which may be switchably activated by switch means 21 to connect to communications device 13. This operation disables, however, communications device 13 from being routed to distributed switch 15. In this way, it will be seen that 3-way conferencing including a signal processing resource 22 is thus only possible by using conference bridge 18 to conference in unassigned signal processing resource 22A onto a two-way conversation between ports 12. The disadvantages of this arrangement have been discussed above.

Figure 3:
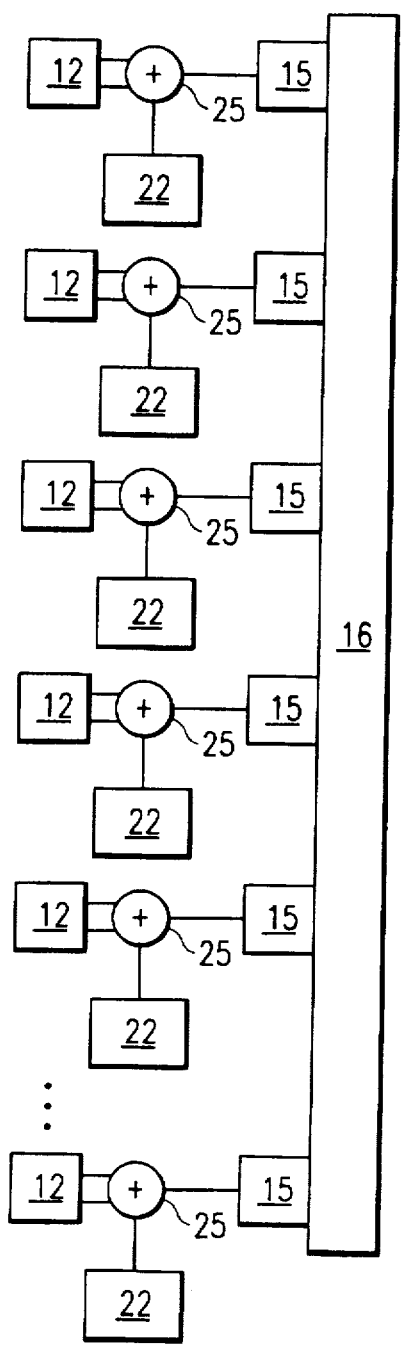
FIG. 3 is a block diagram illustrating the present invention.

Turning now to FIG. 3, a block diagram illustrating the present invention is shown. In comparison with FIG. 2, it will be seen that each port 12 is interconnectable via bus system 16, again as controlled by distributed switch 15.

With further reference to FIG. 3, it will also be seen that ports 12, and advantageously each port 12, provides a signal processing resource 22 permanently connectable into the signal path between port 12 and system bus 16 via a summation resource 25.

Summation resources 25 thus enable the arrangement of FIG. 3 to create 3-way conferences between ports 12 that include participation by signal processing resources 22. Two communications devices or other user resources each coupled to a port 12 are connected into a two-way conversation over system bus 16. The signal processing resource 22 at one of the ports then participates in the conversation while the other signal processing resource 22 is silent. The participating signal processing resource 22 is thus conferenced onto the two-way conversation through summation resource 25.

Alternatively, a single communications device or other user resource may be coupled to a port 12 and may converse with the signal processing resource 22 resident at that port through summation resource 25. Then if a second communications device or other user resource coupled to a different port 12 subsequently desires to conference in on this user/robot conversation, it will be seen from FIG. 3 that this is easily accomplished by simply connecting the two ports 12 via system bus 16. Without further action, summation resource 25 then immediately allows the signal processing resource 22 to be in a 3-way conference with the interconnected communications devices/user resources.

The present invention thus optimizes system bus and conference bridge resources. Of course, conference bridges are not eliminated, and will still be necessary when it is desired to enable 3-way conferences between communications devices or other user resources coupled to three separate ports. Nonetheless, conference traffic involving two ports and a robot is now eliminated from the system bus, and from conference bridge allocation algorithms. This traffic represents a substantial portion of conference traffic typically encountered by a VRU.

Although the present invention has been described and illustrated to this point showing a signal processing resource 22 and a summation resource 25 advantageously resident at each port 12, it will be understood that the present invention is not limited in this regard. Signal processing resources 22 and summation resources 25 may be omitted from one or more ports 12 while still allowing the invention to function, albeit at lower effectiveness. Clearly, additional control over port allocation becomes necessary when only certain of ports 12 have the robot conferencing functionality.

Further, the preferred embodiment assumes that the communication device coupled to a port 12 will frequently be a telephone. In this case, the present invention facilitates 3-way audio conferencing with an audio-responsive robot. It will be understood, however, that the present invention is not limited to functioning in an audio medium. It will be readily appreciated that in accordance with the present invention, user resources of any medium may be coupled to ports 12, and 3-way conferencing with a robot in that medium will be facilitated without the use of a conference bridge. For example, users may be coupled via data lines and conversing by computer. A robotic computer-accessible resource such as a user-accessible information database may then be conferenced onto the computer conversation to allow for concurrent database access and data retrieval by the users. It will further be understood by those in this art that the present invention will also operate in other media, such as text, graphics, DTMF, video, and so on, as well as combinations thereof.

Further still, as noted above, signal processing resource 22 may have a variety of functionality disposed to interact robotically with a user. For example, in the audio-responsive robot example described above, signal processing resources 22 may include automated speech playback, voice record, text-to-speech or voice recognition functionality. It will be understood that according to the present invention, signal processing resources 22 are not limited to have any specific robotic functionality. Nonetheless, for illustrative purposes, FIG. 4 will now be described with signal processing resource 22 having exemplary voice record/playback functionality.

Figure 4:
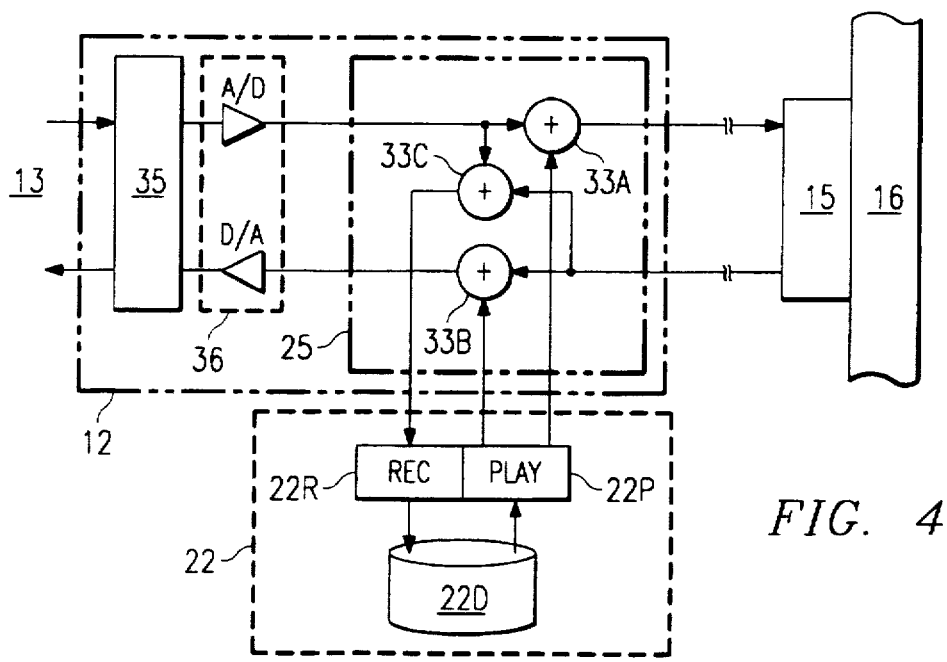
FIG. 4 illustrates summation resources 25 at ports 12 in more detail. An embodiment in which signal processing resource 22 is disposed to record and playback voice is also illustrated.

FIG. 4 illustrates summation resources 25 in more detail. Summation resource 25 is resident at port 12, and includes at least three digital summers 33A, 33B and 33C. Hardware for summation resource 25, including digital summers 33A, 33B and 33C, may be designed, for example, using Digital Signal Processor ("DSP") architecture that includes Siemens switch chips 2245 or 2445.

With further reference to FIG. 4, it will be seen that signals are incoming from and outgoing to communications device 13 through port 12. Summation resource 25 is permanently installed in the signal path of port 12 to system bus 16, and enables permanent conferencing of signal processing resource 22. As noted above, the signal processing resource 22 illustrated on FIG. 4 includes, for illustrative purposes, voice record and play functions 22R and 22P, writing data to and drawing data from storage device 22D.

The configuration of summers 33A, 33B and 33C as shown on FIG. 4 enables the desired 3-way conferencing with signal processing resource 22. Digital summers 33A and 33B enable play function 22P to be added to both sides of the conversation in which communications device 13 is participating. Similarly, digital summer 33C enables record function 22R to record both sides of the conversation in which communications device 13 is participating.

It will be further understood that summers 33A, 33B and 33C are configured in FIG. 4 so that record function 22R will record both sides of communication device 13's conversation without data from playback function 22P combined therewith. It will be appreciated, however, that digital summers 33A and 33B are readily reconfigurable so that their output sides feed summer 33C. In this way, both sides of communication device 13's conversation will be recorded by record function 22R as combined with data from output function 22P.

It will be also understood with reference to FIG. 4 that software controlling the operation of summation resource 25 may also selectively enable combinations of summers 33A, 33B and 33C for desired effects. For example, enabling summer 33B but not summer 33A will allow communications device 13 only to hear information from play function 22P. A "whisper in the ear" effect is thus created.

As noted above, signals from communications device 13 must be in digital format to enable the required processing in accordance with the present invention. Accordingly, with further reference to FIG. 4, port 12 advantageously also includes line terminal interface 35 and digital/analog conversion circuitry 36 to enable analog communications coupled thereto to be processed in digital format. Of course, it will be appreciated that incoming communications already in digital format may bypass line terminal interface 35 and digital/analog conversion circuitry 36, and proceed directly to summation resource 25 for further processing.

Although the present invention and its advantages have been described in detail, it should be understood that various changes, substitutions and alterations can be made herein without departing from the spirit and scope of the invention as defined by the appended claims.

I claim:

1. A voice response unit having robotic conferencing capability, comprising:

a plurality of ports including first and second ports, a first communicator coupled to the first port, a second communicator coupled to the second port;

a bus, the bus disposed to switchably connect said first and second ports to enable a digital conversation along a signal path established therebetween, a first side of the digital conversation comprising the first port receiving digital information transmitted from the second port, a second side of the digital conversation comprising the second port receiving digital information transmitted from the first port;

at least one summation resource permanently inserted in the signal path, at least one of said summation resources including a first summer and a second summer and a third summer, each of said summers disposed to digitally combine digital signals input thereto;

the first summer receiving input from the first side of the digital conversation and from a signal processing resource, output from the first summer disposed to be received at the first port;

the second summer receiving input from the second side of the digital conversation and from the signal processing resource, output from the second summer disposed to be received at the second port; and the third summer receiving input from the first side of the digital conversation and from the second side of the digital conversation, output from the third summer disposed to be received by the signal processing resource.

2. The voice response unit of claim 1, in which said signal processing resource emits digitized speech responsive to information previously transmitted by either of the first and second communicators.

3. The voice response unit of claim 1, in which said first and second and third summers may be selectively enabled in combination.

4. The voice response unit of claim 1, in which the third summer receives input from the first side of the digital conversation before the first summer receives input from the signal processing resource.

5. The voice response unit of claim 1, in which the third summer receives input from the first side of the digital conversation after the first summer receives input from the signal processing resource.

6. The voice response unit of claim 1, in which the third summer receives input from the second side of the digital conversation before the second summer receives input from the signal processing resource.

7. The voice response unit of claim 1, in which the third summer receives input from the second side of the digital conversation after the second summer receives input from the signal processing resource.

8. The voice response unit of claim 1, in which each port in said plurality thereof has a separate summation resource assigned thereto.

9. The voice response unit of claim 1, in which separate summation resources are assigned to less than every port in said plurality thereof.

10. The voice response unit of claim 1, in which said digital conversation is in a medium selected from the group consisting of:

(a) audio; and (b) DTMF.

11. The voice response unit of claim 1, in which said signal processing resource is disposed to process signals so as to enable at least one function selected from the group consisting of:

(a) automated speech playback;

(b) voice record;

(c) text-to-speech conversion; and (d) voice recognition.

12. A method for conferencing robotic digital output and robotic digital input onto a communication, comprising the steps of:

establishing a digital conversation along a signal path between a first port and a second port, the digital conversation comprising the first port receiving digital information transmitted by the second port and the second port receiving digital information transmitted by the first port;

providing a summation resource, said summation resource including one or more digital summers, each of said summers disposed to combine digital signals input thereto;

inserting said summation resource into said signal path;

using said summation resource to create first combined output, said first combined output including robotic digital output combined with digital information transmitted by the second port, said first combined output disposed to be received at the first port;

using said summation resource to create second combined output, said second combined output including robotic digital output combined with digital information transmitted by the first port, said second combined output disposed to be received at the second port; and using said summation resource to create third combined output, said third combined output including digital information transmitted by the first port combined with digital information transmitted by the second port, said third combined output disposed to be received as robotic digital input.

13. The method of claim 12, in which said digital conversation is in a medium selected from the group consisting of:

(a) audio; and (b) DTMF.

14. The method of claim 12, in which said inserting step includes the substep of permanently installing said summation resource in said signal path.

* * * * *